(12) United States Patent
Spinger

(10) Patent No.: US 10,295,136 B2
(45) Date of Patent: May 21, 2019

(54) LIGHT EMISSION ASSEMBLY WITH BEAM SHAPING STRUCTURE

(71) Applicant: Lumileds LLC, San Jose, CA (US)

(72) Inventor: Benno Spinger, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/067,425

(22) PCT Filed: Oct. 27, 2017

(86) PCT No.: PCT/EP2017/077595
§ 371 (c)(1),
(2) Date: Jun. 29, 2018

(87) PCT Pub. No.: WO2018/083025
PCT Pub. Date: May 11, 2018

(65) Prior Publication Data
US 2019/0017673 A1    Jan. 17, 2019

(30) Foreign Application Priority Data

Nov. 7, 2016 (EP) ..................................... 16197580

(51) Int. Cl.
*F21V 5/00* (2018.01)
*G02B 6/00* (2006.01)
(Continued)

(52) U.S. Cl.
CPC ............. *F21S 41/24* (2018.01); *F21S 41/141* (2018.01); *F21S 41/285* (2018.01); *F21Y 2115/10* (2016.08)

(58) Field of Classification Search
CPC .. G02B 6/001; G02B 6/26; G02B 6/36; F21S 41/24; F21S 41/141; F21S 41/285; F21Y 2115/10
See application file for complete search history.

(56) References Cited

U.S. PATENT DOCUMENTS

| 5,396,350 A | 3/1995 | Beeson et al. |
| 6,639,350 B1 | 10/2003 | Sejkora |

(Continued)

FOREIGN PATENT DOCUMENTS

| DE | 102014200369 A1 | 7/2015 |
| WO | 2009/053887 A2 | 4/2009 |
| WO | 2012/027851 A1 | 3/2012 |

*Primary Examiner* — Anabel Ton
(74) *Attorney, Agent, or Firm* — Volpe and Koenig, P.C.

(57) ABSTRACT

A light emitting assembly comprising: a light emitting structure with a first light emission surface comprising one or more point-like light sources to emit light; a transparent beam shaping structure comprising a second light emission surface and a second light receiving surface, wherein the second light receiving surface is arranged at a distance above the first light emission surface to create an air gap to receive light emitted from the light emitting structure within an acceptance angle δ for the beam shaping structure to shape a resulting beam of light being emitted through the second light emission surface; and one or more transparent light guiding elements arranged between the beam shaping structure and the light emitting structure suitably shaped to refract at least part of the light emitted from the first light emission surface under an emergent angle ε larger than the acceptance angle δ towards the beam shaping structure.

12 Claims, 4 Drawing Sheets

(51) Int. Cl.
    *G02B 19/00*    (2006.01)
    *F21S 41/24*    (2018.01)
    *F21S 41/20*    (2018.01)
    *F21S 41/141*   (2018.01)
    *F21Y 115/10*   (2016.01)

(56) References Cited

U.S. PATENT DOCUMENTS

| | | | | |
|---|---|---|---|---|
| 7,530,719 | B2* | 5/2009 | Yamashita | G02B 5/045 |
| | | | | 362/600 |
| 7,575,344 | B2* | 8/2009 | Lin | F21S 6/003 |
| | | | | 362/336 |
| 7,772,604 | B2* | 8/2010 | Duong | H01L 33/58 |
| | | | | 257/95 |
| 8,177,408 | B1* | 5/2012 | Coleman | G02B 3/005 |
| | | | | 362/615 |
| 8,328,403 | B1 | 12/2012 | Morgan et al. | |
| 2008/0068852 | A1* | 3/2008 | Goihl | F21V 5/002 |
| | | | | 362/509 |
| 2014/0093948 | A1* | 4/2014 | Durrer | G01N 21/17 |
| | | | | 435/288.7 |
| 2014/0140091 | A1* | 5/2014 | Vasylyev | G02B 6/001 |
| | | | | 362/606 |
| 2018/0347785 | A1* | 12/2018 | Kawaguchi | F21S 2/00 |

\* cited by examiner

LIGHT EMISSION ASSEMBLY WITH BEAM SHAPING STRUCTURE

FIELD OF THE INVENTION

The invention relates to a light emission assembly with beam shaping structure with increased light extraction. The invention further relates to a vehicle light assembly comprising this light emission assembly, especially to a vehicle front light assembly.

BACKGROUND OF THE INVENTION

Light sources may comprise light-emitting diodes (LED) or other point-like light sources. The small size of LEDs enables customization of light patterns which can be provided by means of light emitting assemblies comprising light collimation structure in order to shape the resulting light beam. For automotive adaptive drive beam (ADB) systems or matrix headlamps such pre-collimated optics with an air gap between collimator and light source are often used. The efficiency of such optical systems strongly depends on the distance between collimator and light source. It would be desirable to obtain a more efficient light emitting assembly providing a higher luminance with a more predictable emission color.

U.S. Pat. No. 8,328,403 B1 discloses a light-guide illumination device and system comprising a light source, a light redirecting slab, an air gap and a light guide assembly. U.S. Pat. No. 5,396,350 A discloses a backlighting apparatus comprising light sources and a slab waveguide. An array of microprisms is provided at the light entrance face of the slab waveguide. DE 10 2014 200369 A1 discloses a light guide with an array of micro-optics at the light entrance face.

SUMMARY OF THE INVENTION

It is an object of the present invention to provide a more efficient emitting assembly having a higher luminance and a more predictable emission color. The light emitting assembly aims to provide a higher luminance and a more predictable emission color by incorporating an additional optical element suitable to shape at least part of the light being emitted under an emergent angle which would be too large to enter the beam shaping structure without the additional optical element. This additional optical element further establishes a defined distance between beam shaping structure and light source providing a constant and predictable color of the emitted light.

The invention is defined by the independent claims. The dependent claims define advantageous embodiments.

According to a first aspect a light emitting assembly is provided. The light emitting assembly comprises:
- a light emitting structure with a first light emission surface comprising one or more point-like light sources, preferably light-emitting diodes, to emit light from the first light emission surface;
- a transparent beam shaping structure comprising a second light emission surface and a second light receiving surface opposite to the second light emission surface, wherein the second light receiving surface is arranged at a distance above the first light emission surface in order to create an air gap between the first light emission surface and the second light receiving surface to receive light emitted from the light emitting structure within an acceptance angle $\delta$ for the beam shaping structure to shape a resulting beam of light being emitted through the second light emission surface; and
- one or more transparent light guiding elements arranged between the beam shaping structure and the light emitting structure being suitably shaped to refract at least a part of light which is emitted from the first light emission surface under an emergent angle $\varepsilon$ larger than the acceptance angle $\delta$ towards the beam shaping structure.

The point-like light source of the light emitting structure denotes any light source, which has a small light emission area (or volume) and has a wide emission cone providing an essentially non-directed light emission. Such point-like light sources may be LEDs or semiconductor lasers, e.g. quantum wells or dots. The light emitting structure may comprise a single point-like light source, e.g. a LED, or an array of point-like sight sources, e.g. an LED array. In case of a light emitting assembly having only one point-like light source the beam shaping structure is arranged to shape the beam of light of this single point-like light source. In case of an array of point-like light sources emitting light towards the beam shaping structure, this structure is arranged to shape the light emitted from this array of point-like light sources. In case of an array of point-like light sources these light source may be arranged in a lateral distance of equal or less than 3 mm between the individual point-like light sources. In other embodiments also a lateral array of light emitting assemblies might be arranged with a lateral distance of equal or less than 3 mm between individual light emitting assemblies forming a lamp assembly.

Beam shaping structures being in touch with the light emitting structures without an air gap in between cause two disadvantageous effects: first the increased extraction of light from the light emitting structure into the beam shaping structure leading to a non-desired blue color shift of the resulting light spectrum emitted from the beam shaping element. In order to compensate for this color shift, additional measures causing additional effort during manufacturing have to be incorporated into the assembly design. Furthermore the color shift is inconsistent within a number of produced light emitting assemblies. Secondly a significant portion of the extracted light beams will leave the beam shaping structure through its side walls being lost leading to a decreased luminance of such light emitting assemblies without air gaps.

In contrast to non-air gap assemblies according to prior art devices without light guiding elements between the beam shaping structure and the light emitting structure suffer from alignment tolerances or varying distances due to thermal expansion require larger air gaps of about 200 μm in order to avoid the beam shaping structure touching the surface of the light emitting structure with its entire light receiving surface. The large air gap size limits the luminance of the light emitting assemblies due to the light losses via the air gap.

Compared to such prior art devices the light emitting assembly according to the present invention enables to provide a very small air gap significantly less than 200 μm, preferably of less than 100 μm, more preferably of only 20-30 μm, between the light emitting structure and the beam shaping structure due to the beam shaping structure having a minimum distance to the light emitting structure defined by the size of the light guiding element. Furthermore a significant part of the light being lost due to the air gap will be refracted into the beam shaping structure by the light guiding element. With a suitably shaped light guiding element it is possible to add also this part of the light to the light being emitted through the second light emission surface. With light emitting assemblies according to the present invention an increase of luminance of 15-20% might be achieved. In an embodiment the beam shaping structure may be applied as a collimating structure in order to emit collimated light through the second light emission surface The light emitting assembly may be provided in such a way that at least one light guiding element comprises a third light emission surface being in contact with the second light receiving surface of the beam shaping structure and a contact surface being in contact with the first light emission surface of the light emitting structure. The mechanical contact between the light guiding element on one side to the beam shaping structure and on the other side to the light emitting structure defines a robust air gap with a constant thickness even under severe operation conditions, e.g. of operating temperatures of up to 170° C. for vehicle front light applications. Here the contact shall not damage the light emitting structure. This might be achieved be using robust phosphors on the first light emission surface or by coating the light sources and/or the first light emission surface. Also the material of the light guiding element might be adapted not to damage the light emitting structure. Silicone is an example of advantageous transparent materials providing a soft material contact to the contacted surfaces as well as being stable even under such high temperatures, which also could be used as a material for the beam shaping structure. In other cases also glass, PC or PMMA might be used for the light guiding element and/or the beam shaping structure.

The light guiding elements and the beam shaping structure may be provided as a one-piece element, which makes the assembly of the light emitting assembly easier.

The light emitting assembly may be provided in such way that the third light emission surface has a larger size than the contact surface and the light guiding element further comprises a third light receiving surface towards the air gap connecting the third light emission surface with the contact surface. In this cases the third light receiving surface as the side faces of the light guiding element facing towards the air gap are aligned advantageously with a surface directing towards the first light emission surface under a certain angle to refract the light beams entering the light guiding element via the side faces towards the direction perpendicular to the first light emission surface leading to an increased amount of light entering the beam shaping structure under an angle suitable to be light-shaped by the beam shaping structure. The certain angle of the alignment of the third light receiving surface to the first light emission surface is determined by the ratio of the sizes of the third light emission surface and the contact surface.

The light emitting assembly may be arranged in such a way that the third light emission surface and the contact surface are aligned in parallel. This makes the assembly and alignment of optical components of the light emitting assembly more easily and provides an air gap with a constant gap thickness over the entire first light emission surface.

The light emitting assembly may be arranged in such a way that the light guiding element has a conical shape, wherein an angle $\alpha$ is established between the third light receiving surface and the third light emission surface. The conical shape provides defined geometrical properties for the light guiding element to refract the light beams with large extraction angle from the first light emission surface into the beam shaping structure in order to avoid light losses of the light emitting assembly.

The light emitting assembly may be arranged in such a way that also the beam shaping structure has a conical shape with a side face between second light receiving surface and the second light emission surfaces, wherein an angle $\beta$ is established between a direction perpendicular to the second light receiving surface and the side face. The alignment of the side face of the beam shaping structure with respect to the second light emission and light receiving surfaces further determines the amount of emitted light being emitted from the beam shaping structure.

Here the light emitting assembly may be arranged in such a way that the second light receiving surface and the second light emission surface are arranged in parallel to each other.

The light emitting assembly may be arranged in such a way that the angle $\alpha$ plus $\arcsin(\sin(90-\alpha)/n_2)$ is less than a sum of the angle $\beta$ and the acceptance angle $\delta$, with $n_2$ the refraction index of the light guiding element material. In this case, all light being refracted by the light guiding element into the beam shaping structure will be emitted from the beam shaping structure. The losses via the side faces are avoided. The acceptance angle denotes the angle between a line connecting the geometrical center of the first light emission surface and the outer edge of the light receiving surface and another line perpendicular to the first light emission surface through its geometrical center.

The light emitting assembly may be arranged in such a way that at least the light guiding element is made of PMMA, PC or glass, more preferably at least the light guiding element is made of silicone. The acceptance angle $\delta$ e.g. of PMMA is 47.9°, the acceptance angle $\delta$ e.g. of silicone is 44.8°. PMMA, PC and glass are well suited with respect to the acceptance angle. However the temperature stability of PMMA and PC is not as high as for silicone. Compared to glass also providing a high temperature stability, silicone is a more soft material preferably suited to be in contact to the first light emission surface of the light emitting structure.

The light emitting assembly may be arranged in such a way that the light emitting assembly comprises multiple light guiding elements being suitably distributed between the first light emission surface and the second light receiving surface in order to provide a stable position of the beam shaping structure within the assembly. The multiple light guiding elements may be arranged around the geometrical center of the first light emission surface or may cover this geometrical center as well. A stable position provided by multiple light guiding elements results in a more mechanically robust light emitting assembly.

The light emitting assembly may be arranged in such a way that at least some of the light guiding elements are arranged to cover the first light emission surface at least at a position of half a distance between a geometrical center of the first light emission surface and a rim of the second light receiving surface projected onto the first light emission surface. Here the very stable position of the beam shaping structure is combined with the more effective refraction of light beams towards the beam shaping structure compared to other positions of the light guiding elements.

The light emitting assembly may be arranged in such a way that the light emitting assembly only comprises one light guiding element arranged at a position on the first light emission surface covering the geometrical center of the first light emission surface. One light guiding element makes the construction more easily. Here the contact surface and the third light emission surface should be designed with a suited size and alignment in order to provide a robust light emitting assembly with an increase luminance.

The light emitting assembly may be arranged in such a way that the first light emission surface being in contact with the contact surface of the light guiding element comprises mechanically robust Phosphors or silicone-coated phosphors. In this case the light guiding element may comprise a smaller contact surface and/or more light guiding elements might be used and/or the light guiding element may consist of a more rigid material without damaging the first light emission surface and/or the point-like light sources of the light emitting structure.

A vehicle light assembly may comprise the at least one light emitting assembly in accordance with any embodiment described above.

The vehicle light assembly may, for example, be used as a vehicle front light assembly or may be used in daytime running light (DRL), tail light, stop light or turn light.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a principal sketch of a light emitting assembly according to prior art with beam shaping structure and light source being in direct contact.

FIG. 2 shows a principal sketch of a light emitting assembly according to prior art with an air gap between beam shaping structure and light source.

FIG. 3 shows a principal sketch of an embodiment of the light emitting assembly according to the present invention with light emitted from (a) the center and (b) from outside the center of light emitting structure.

FIG. 4 shows a principal sketch of other embodiments of the light emitting assembly according to the present invention.

FIG. 5 shows a principal sketch of angle $\alpha$ defined by the light guiding element and angle $\beta$ defined by the beam shaping structure of the present invention.

FIG. 6 shows a principal sketch of an embodiment of a vehicle light assembly or a vehicle front light assembly according to the present invention.

In the Figures, like numbers refer to like objects throughout. Objects in the Figs. are not necessarily drawn to scale.

DETAILED DESCRIPTION OF EMBODIMENTS

Various embodiments of the invention will now be described by means of the Figures.

Figure 1:
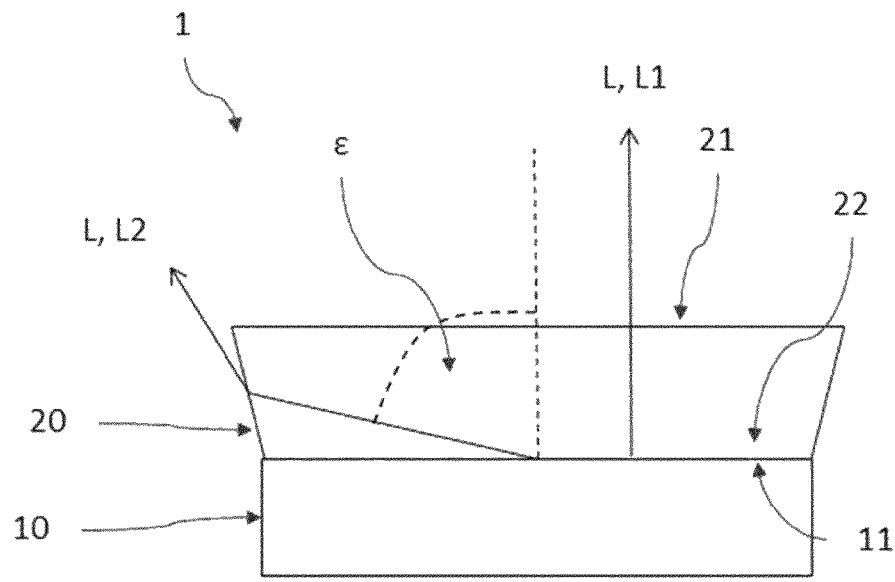

FIG. 1 shows a light emitting assembly 1 according to prior art comprising a light emitting structure 10 with a first light emission surface 11 comprising one or more point-like light sources, preferably light-emitting diodes, to emit light L from the first light emission surface 11 to a transparent beam shaping structure 20 in direct contact to the first light emission surface 11 of the light emitting structure 10 comprising a second light emission surface 21 and a second light receiving surface 22 opposite to the second light emission surface 21. This assembly enhances the extraction of light from the light emitting structure 10 into the beam shaping structure 20. However a part of the received light L2 emitted from the light emitting structure 10 will leave the beam shaping structure 20 through the side faces of the beam shaping structure. Therefore the luminance L1 of the light emitted from the beam shaping structure decreases about the amount of light L2 being lost via the side faces. Furthermore the light L1 shows a non-desired blue shift compared to the light originally emitted from the light emitting structure 10.

Figure 2:
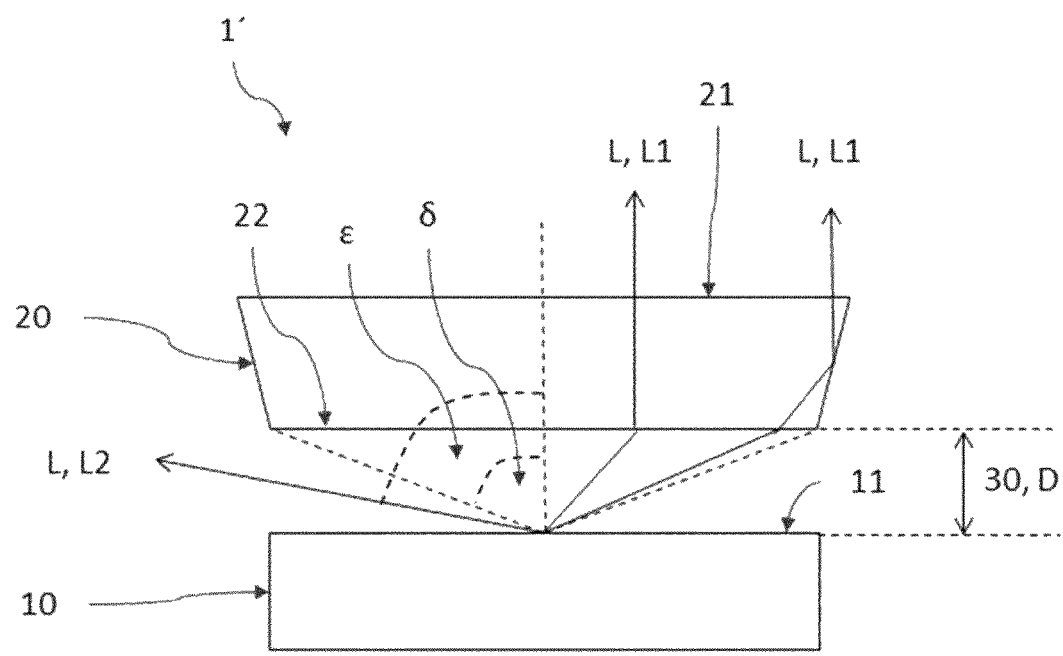

FIG. 2 shows a light emitting assembly 1" according to prior art comprising a light emitting structure 10 with a first light emission surface 11 comprising one or more point-like light sources, preferably light-emitting diodes, to emit light L from the first light emission surface 11 to a transparent beam shaping structure 20 comprising a second light emission surface 21 and a second light receiving surface 22 opposite to the second light emission surface 21, wherein the second light receiving surface 22 is arranged at a distance D above the first light emission surface 11 of typically 200 µm in order to create an air gap 30 between the first light emission surface 11 and the second light receiving surface 22 to receive light L1 emitted from the light emitting structure 10 within an acceptance angle $\delta$ for the beam shaping structure 20 to be emitted through the second light emission surface 22. The large air gap leads to losses of light L2 being emitted from the first light emission surface 11 with an emergence angle $\varepsilon$ larger than the acceptance angle $\delta$. Therefore the luminance of such light emitting assemblies is still lower than desired.

Figure 3:
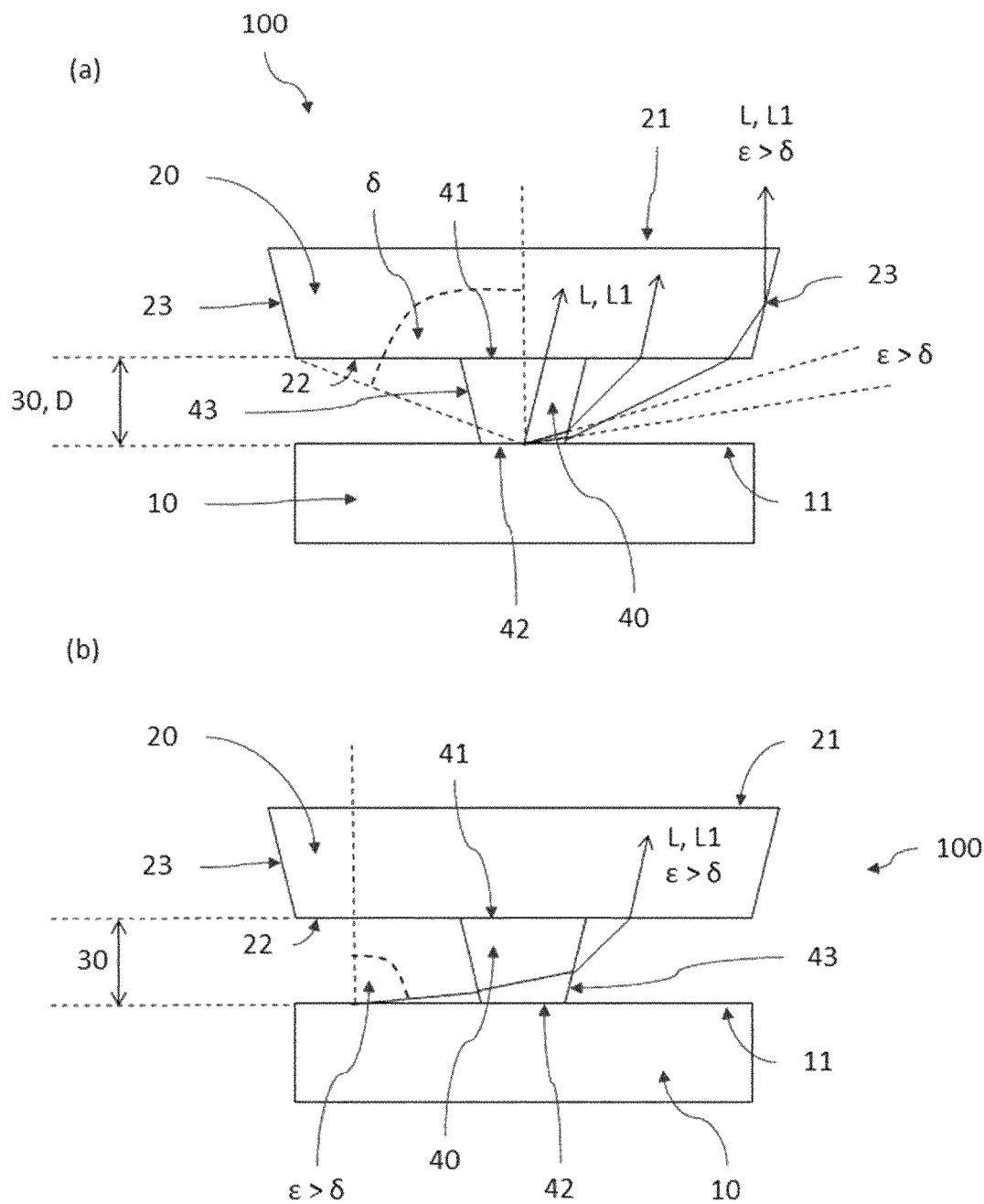

FIG. 3 shows a principal sketch of an embodiment of the light emitting assembly 100 according to the present invention with light emitted from (a) the center and (b) from outside the center of light emitting structure 10. The light emitting assembly 100 comprises a light emitting structure 10 with a first light emission surface 11 comprising one or more point-like light sources, preferably light-emitting diodes, to emit light L from the first light emission surface 11. The light emitting assembly further comprises a transparent beam shaping structure 20 comprising a second light emission surface 21 and a second light receiving surface 22 opposite to the second light emission surface 21, wherein the second light receiving surface 22 is arranged at a distance D above the first light emission surface 11 in order to create an air gap 30 between the first light emission surface 11 and the second light receiving surface 22 to receive light L1 emitted from the light emitting structure 10 within an acceptance angle $\delta$ for the beam shaping structure 20 to shape a resulting beam of light L1 to be emitted through the second light emission surface 22. In order to provide a defined and robust air gap and in order to refract a part of the light with an emergence angle $\varepsilon$ larger than the acceptance angle $\delta$ into the beam shaping structure 20, the light emitting assembly 100 further comprises one or more transparent light guiding elements 40 arranged between the beam shaping structure 20 and the light emitting structure 10 being suitably shaped to refract at least a part of light L2 which is emitted from the first light emission surface 11 under an emergent angle $\varepsilon$ larger than the acceptance angle $\delta$ towards the beam shaping structure 20. The light guiding element 40 is suitable to add also this part L2 to the light L being emitted through the second light emission surface 22. The effect of color shift is minimized with this embodiment.

Here the light guiding element 40 comprises a third light emission surface 41 being in contact with the second light receiving surface 22 of the beam shaping structure 20 and a contact surface 42 being in contact with the first light emission surface 11 of the light emitting structure 10, where the third light emission surface 41 has a larger size than the contact surface 42 providing a third light receiving surface 43 towards the air gap 30 connecting the third light emission surface 41 with the contact surface 42 defining a conical shape of the light guiding element 40. The third light emission surface 41 and the contact surface 42 as well as the second light receiving surface 22 and the second light emission surface 21 are arranged in parallel to each other.

Figure 4:
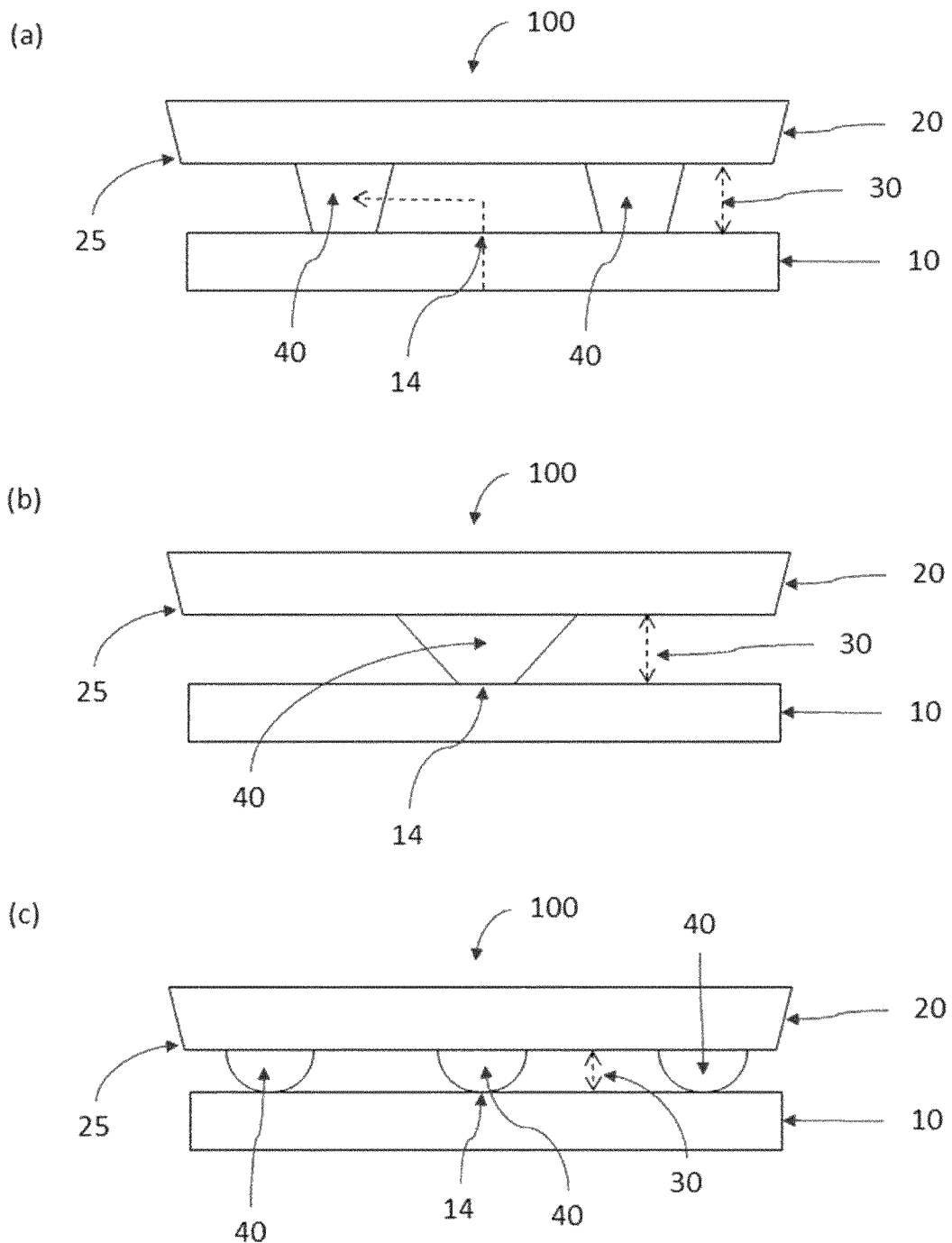

FIG. 4 shows a principal sketch of other embodiments of the light emitting assembly according to the present invention. The light emitting assembly 100 may comprises multiple light guiding elements 40 being suitably distributed between the first light emission surface 11 and the second light receiving surface 22 in order to provide a stable position of the beam shaping structure 20 relative to the light emitting structure 10 as shown in FIGS. 4a and 4c. In FIG. 4a the light emitting assembly 100 comprises two conical light guiding elements 40 arranged in between the beam shaping structure 20 and the light emitting structure 10 at a position of half of the distance between a geometrical center 14 of the first light emission surface 11 and a rim 25 of the second light receiving surface 22 projected onto the first light emission surface 11. In FIG. 4c the light emitting assembly 100 comprises three spherical light guiding elements 40 arranged in between the beam shaping structure 20 and the light emitting structure 10, where two of the light guiding elements 40 are arranged at a position of half of the distance between the geometrical center 14 of the first light emission surface 11 and a rim 25 of the second light receiving surface 22 projected onto the first light emission surface 11 while the light guiding element 40 covers the geometrical center of the first light emission surface 11. The position of the light guiding elements 40 might be adapted to other applications deviating from embodiments shown here.

In FIG. 4b the light emitting assembly 100 only comprises one light guiding element 40 arranged at a position on the first light emission surface 11 covering the geometrical center 14 of the first light emission surface 11.

In these embodiments and the embodiment of FIG. 3 the first light emission surface 11 being in contact with the contact surface 42 of the light guiding elements 40 may comprise mechanically robust Phosphors or silicone-coated phosphors in order to protect the first light emission surface 11.

In these embodiments and the embodiment of FIG. 3 the light guiding element 40 and/or the beam shaping structures 20 might be made of PMMA, PC or glass. Preferably the light guiding element 40 and/or the beam shaping structure 20 are made of silicone. More preferably the light guiding element 40 and/or the beam shaping structure 20 are made as one-piece element.

Figure 5:
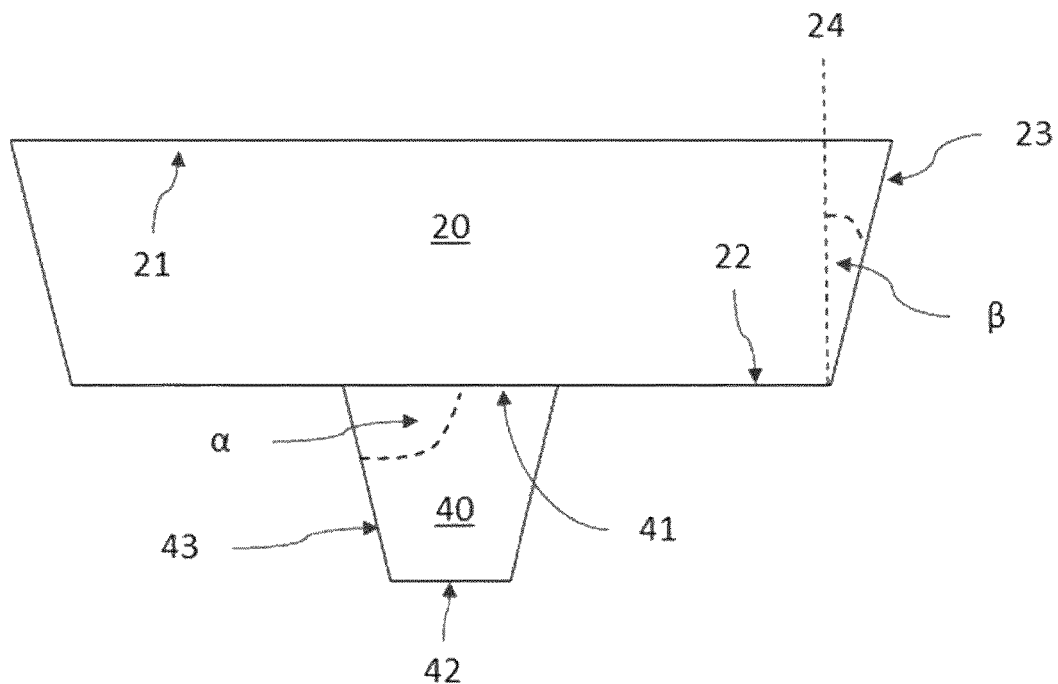

FIG. 5 shows the light guiding element 40 and the beam shaping structure 20 of the light emitting assembly 100. The light emitting structure 10 is not shown here for ease of understanding. The light guiding element 40 has a conical shape, wherein an angle $\alpha$ is established between the third light receiving surface 43 and the third light emission surface 41 being in parallel to the second light receiving surface 22 of the beam shaping structure 20 also having a conical shape with a side face 23 between second light receiving surface 22 and the second light emission surfaces 21, wherein an angle $\beta$ is established between a direction perpendicular 24 to the second light receiving surface 22 and the side face 23, where the second light receiving surface 22 and the second light emission surface 21 are arranged in parallel to each other. In order to optimize the luminance of the light emitting assembly 100 the angle $\alpha$ is adjusted to be less than a sum of the angle $\beta$ and the acceptance angle $\delta$ (see FIG. 3).

Figure 6:
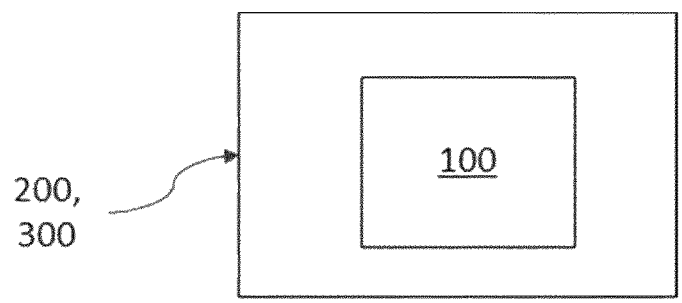

FIG. 6 shows a principal sketch of an embodiment of a vehicle light assembly or a vehicle front light assembly according to the present invention. A vehicle light assembly 200 comprising at least one of the light emitting assembly 100 in accordance with the present invention. The vehicle light assembly 200 might be arranged as a vehicle front light assembly 300.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 1, 1' light emitting assembly according prior art
10 light emitting structure
11 first light emission surface of the light emitting structure
14 geometrical center of the first light emission surface
20 beam shaping structure
21 second light emission surface of the beam shaping structure
22 second light receiving surface of the beam shaping structure
23 side face of the beam shaping structure
24 direction perpendicular to the second light receiving surface
25 rim of the second light receiving structure
30 air gap
40 light guiding element
41 third light emission surface of the light guiding element
42 contact surface of the light guiding element
43 third light receiving surface of the light guiding element
100 light emitting assembly according to the present
200 vehicle light assembly according to the present
300 vehicle front light assembly according to the present
D distance between first light emission surface and second light receiving surface
L emitted light
L1 emitted light with emergent angle<acceptance angle
L2 emitted light with emergent angle>acceptance angle
$\alpha$ angle between the third light receiving surface and the third light emission surface
$\beta$ angle between the direction perpendicular to the second light receiving surface and the side face
$\delta$ acceptance angle
$\varepsilon$ emergent angle

The invention claimed is:

1. A light emitting assembly comprising:
a light emitting structure with a first light emission surface comprising one or more point-like light sources, preferably light-emitting diodes, to emit light from the first light emission surface;
a transparent beam shaping structure comprising a second light emission surface and a second light receiving surface opposite to the second light emission surface, wherein the second light receiving surface is arranged at a distance, preferably of 20-30 μm, above the first light emission surface in order to create an air gap between the first light emission surface and the second light receiving surface to receive light emitted from the light emitting structure within an acceptance angle δ for the beam shaping structure to shape a resulting beam of light being emitted through the second light emission surface; and
one or more transparent light guiding elements arranged between the beam shaping structure and the light emitting structure being suitably shaped to refract at least a part of light which is emitted from the first light emission surface under an emergent angle ε larger than the acceptance angle δ towards the beam shaping structure,
wherein at least one light guiding element comprises a third light emission surface being in contact with the second light receiving surface of the beam shaping structure, a contact surface being in contact with the first light emission surface of the light emitting structure, and a third light receiving surface towards the air gap connecting the third light emission surface with the contact surface;
wherein the at least one light guiding element has a conical shape with the third light emission surface having a larger size than the contact surface and with an angle α established between the third light receiving surface and the third light emission surface; and
wherein also the beam shaping structure has a conical shape with a side face between second light receiving surface and the second light emission surfaces and an angle β established between a direction perpendicular to the second light receiving surface and the side face.

2. The light emitting assembly according to claim 1, wherein the light guiding elements and the beam shaping structure are made as a one-piece element.

3. The light emitting assembly according to claim 1, wherein the third light emission surface and the contact surface are aligned in parallel.

4. The light emitting assembly according to claim 1, wherein the second light receiving surface and the second light emission surface are arranged in parallel to each other.

5. The light emitting assembly according to claim 1, wherein the angle α plus $\arcsin(\sin(90-\alpha)/n_2)$ is less than a sum of the angle and the acceptance angle β with $n_2$ as refraction index of the light guiding element material.

6. The light emitting assembly according to claim 1, wherein at least the light guiding element is made of PMMA, PC or glass, more preferably at least the light guiding element is made of silicone.

7. The light emitting assembly according to claim 1, wherein the light emitting assembly comprises multiple light guiding elements being suitably distributed between the first light emission surface and the second light receiving surface in order to provide a stable position of the beam shaping structure.

8. The light emitting assembly according to claim 7, wherein at least some of the light guiding elements are arranged to cover the first light emission surface at least at a position of half a distance between a geometrical center of the first light emission surface and a rim of the second light receiving surface projected onto the first light emission surface.

9. The light emitting assembly according to claim 1, wherein the light emitting assembly only comprises one light guiding element arranged at a position on the first light emission surface covering the geometrical center of the first light emission surface.

10. The light emitting assembly according to claim 1, wherein the first light emission surface being in contact with the contact surface of the light emitting structure comprises mechanically robust Phosphors or silicone-coated phosphors.

11. A vehicle light assembly comprising the light emitting assembly according to claim 1.

12. A vehicle light assembly according to claim 11 arranged as a vehicle front light assembly.

* * * * *